US011242839B2

(12) United States Patent
Ohlerich et al.

(10) Patent No.: US 11,242,839 B2
(45) Date of Patent: Feb. 8, 2022

(54) SEMI-FINISHED PRODUCT FOR A CABLE GUIDE SYSTEM OF A WIND TURBINE COMPONENT, WIND TURBINE COMPONENT, WIND TURBINE ROTOR BLADE AND METHODS

(71) Applicant: Nordex Energy GmbH, Hamburg (DE)

(72) Inventors: Nick Ohlerich, Rostock (DE); Jonas Henschen, Wismar (DE)

(73) Assignee: NORDEX ENERGY SE & CO. KG, Hamburg (DE)

( * ) Notice: Subject to any disclaimer, the term of this patent is extended or adjusted under 35 U.S.C. 154(b) by 0 days.

(21) Appl. No.: 16/879,364

(22) Filed: May 20, 2020

(65) Prior Publication Data

US 2020/0370535 A1    Nov. 26, 2020

(30) Foreign Application Priority Data

May 21, 2019   (EP) .................................. 19175705

(51) Int. Cl.
*F03D 1/06* (2006.01)
*B29D 99/00* (2010.01)
(Continued)

(52) U.S. Cl.
CPC ....... *F03D 1/0675* (2013.01); *B29D 99/0028* (2013.01); *B29C 70/443* (2013.01); *B29L 2031/085* (2013.01); *B32B 2262/101* (2013.01); *B32B 2603/00* (2013.01); *F05B 2280/6003* (2013.01)

(58) Field of Classification Search
CPC ........ F03D 1/0675; F03D 80/30; F03D 80/40; F03D 80/60; B29D 99/0028; B29C 70/443; B29L 2031/085; B32B 2262/101; B32B 603/00; F05B 2280/6003; H02G 1/06; H02G 1/08; H02G 1/083
See application file for complete search history.

(56) References Cited

U.S. PATENT DOCUMENTS 8,622,710 B2   1/2014 Rindt et al.
9,920,739 B2 *  3/2018 Akhtar .................... F03D 13/10
(Continued)

FOREIGN PATENT DOCUMENTS

RU        02617837 C2    2/2017
WO    WO 2005071382 A1   10/2006
(Continued)

*Primary Examiner* — Courtney D Heinle
*Assistant Examiner* — Sang K Kim
(74) *Attorney, Agent, or Firm* — Lathrop GPM LLP

(57) ABSTRACT

The invention relates to a semi-finished product (134) for a cable guide system in a wind turbine component having a layer-like structure (135) with
a carrier tape (136),
a plurality of cable fastening elements (138) which are fixed in place distributed along the length (L) of the carrier tape (136), and
a top layer (142) with a plurality of cutouts or incisions (144), wherein the cable fastening elements (138) are arranged between the top layer (142) and carrier tape (136) in such a way that each cable fastening element (138) at least in part projects out from the top layer (142) from a corresponding cutout or incision (144).

The invention also relates to a wind turbine component, a wind turbine a wind turbine rotor blade and methods.

16 Claims, 3 Drawing Sheets

(51) Int. Cl.
*B29C 70/44* (2006.01)
*B29L 31/08* (2006.01)

(56) References Cited

U.S. PATENT DOCUMENTS

| | | |
|---|---|---|
| 2010/0181268 A1 | 7/2010 | Benson |
| 2010/0227112 A1* | 9/2010 | Han ................. B29C 70/10 |
| | | 428/92 |
| 2017/0058869 A1 | 3/2017 | Caruso et al. |
| 2020/0309095 A1* | 10/2020 | Spandley ............... F03D 13/00 |
| 2020/0386203 A1* | 12/2020 | Lund-Laverick ..... B29C 70/342 |
| 2021/0079896 A1* | 3/2021 | Herrig ................. F03D 7/0264 |
| 2021/0102523 A1* | 4/2021 | Smith .................. B29C 66/131 |

FOREIGN PATENT DOCUMENTS

| | | |
|---|---|---|
| WO | WO 2013/001665 | 1/2013 |
| WO | WO 2017/220096 | 12/2017 |

\* cited by examiner

SEMI-FINISHED PRODUCT FOR A CABLE GUIDE SYSTEM OF A WIND TURBINE COMPONENT, WIND TURBINE COMPONENT, WIND TURBINE ROTOR BLADE AND METHODS

The invention relates to a semi-finished product for a cable guide system in a wind turbine rotor blade, to a wind turbine rotor blade and to methods for producing a component part of a wind turbine rotor blade.

Wind turbines are used to convert the energy of the wind into electrical energy. To this end, they conventionally have one or more rotor blades, also known as wind turbine rotor blades. A great variety of cables are laid in a rotor blade in order to integrate electrical and optical systems into the rotor blade. Cables may, for example, extend along the inner shells, the main web and the base plate into the hub of wind turbine, various cable guide systems being available. Reference may be by way of example to EP 2 532 883 B1. These systems are often involve major installation effort and are relatively inflexible in the place of installation and they are furthermore often not easy to maintain.

One object of the invention is to provide a concept for a cable guide system which permits efficient and flexible use during installation processes not only during rotor blade manufacture but also during retrofitting in the field. Repair and maintenance should furthermore also be particularly straightforwardly possible.

One aspect discloses a semi-finished product for a cable guide system in a wind turbine component. The semi-finished product has a layer-like structure. The layer-like structure comprises a carrier tape and a plurality of cable fastening elements which are fixed in place distributed along the length of the carrier tape. The structure furthermore comprises a top layer with a plurality of cutouts or incisions, wherein the cable fastening elements are arranged between the top layer and carrier tape in such a way that each cable fastening element at least in part projects out from the top layer from a corresponding cutout or incision.

The described semi-finished product is configured to be fitted on or in a wind turbine component and so permits the formation of a cable guide system. In particular, it is possible by means of the cable fastening elements to install and lay cables or apparatuses such as empty conduits for laying and guiding the cables. The semi-finished product may be fitted at any stage of the life cycle of the rotor blade (preproduction, preform construction, fitting out, final assembly, erection or also on the finished turbine). The wind turbine component is in particular a wind turbine rotor blade or a component part thereof, such as for example a rotor blade half-shell, a web, a spar or a base plate. The semi-finished product may also described as a cable retainer or cable retaining device.

The semi-finished product is designed such that it may, on the one hand, be a component part of a (vacuum) infusion laminate. It is as a consequence, for example, possible to place the semi-finished product during rotor blade shell construction or also during the construction of preproduction parts (webs, base plate). The semi-finished product is, for example, positioned as the final layer in the lay-up structure and prior to the materials of the infusion structure. After the infusion process and for example after stripping off a peel ply fabric, the cable fastening elements are exposed and require no further finishing. On the other hand, the semi-finished product may also be laminated by means of hand lay-up, i.e. manually, onto already cured fiber composite structures.

Installation of the semi-finished products by hand lay-up is conceivable for repairs during manufacture or in the field and also for retrofitting operations. Adhesive resins may, for example, be dispensed with.

Processing time in an infusion structure is practically negligible. Processing time during hand lay-up is distinctly shorter in comparative terms than in previously known cable guide systems, in particular thanks to adhesive resins being dispensed with (for example approx. 50% shorter).

The disclosed semi-finished product may in particular be manufactured from prefabricated standard parts such that materials costs may be kept very low.

The disclosed semi-finished product may be used in prefabricated form, for instance as reel material, or already prefabricated to length and directly finable. Using such prefabricated semi-finished products greatly simplifies material procurement and provision.

The semi-finished product furthermore permits simple installation of cables or appropriate aids which do not themselves have to be additionally adhesively bonded but may, for example, be mechanically connected to the cable fastening elements.

A further advantage is that defective cable fastening elements or semi-finished products may for example be easily ground away and overlaminated, for example with new cable fastening elements or semi-finished products.

The semi-finished product furthermore ensures that cables attached by means of the cable fastening elements are readily accessible over the entire product life cycle and are thus particularly easily maintainable and replaceable.

The semi-finished product furthermore permits low weight, for example only 250 g/m.

The carrier tape includes, for example, a fiber material. The carrier tape is, for example, produced from a glass fiber reinforced plastics material. The carrier tape is in particular already cured. The carrier tape is for example of flexible or bendable construction such that the semi-finished product may be prefabricated and efficiently transported, for instance by winding onto a reel.

The cable fastening elements are configured for indirect or direct fastening of cables. For example, cables may be laid, clicked, engaged or snapped in place directly into the cable fastening elements without further aids. Cables may alternatively or additionally be fastened to the cable fastening elements by means of aids or fastening components such as cable ties. The cable fastening elements are alternatively or additionally configured for receiving empty conduits which may in turn be indirectly or directly connected to the cable fastening elements and may guide one or more cables.

The carrier tape is for example dimensioned in a thickness such that any indentation of the cable fastening elements in the layer-like structure is prevented or at least reduced. The carrier tape furthermore permits good handling of the plurality of cable fastening elements, in particular on fixing in place on the carrier tape.

According to one embodiment, the cable fastening elements are adhesively bonded to the carrier tape. This assists with simple and secure installation of the cable fastening elements for the semi-finished product.

According to one embodiment, the semi-finished product includes one or more adhesive tapes, for instance mesh adhesive tape, which are arranged between the top layer and the carrier tape and adhesively connect the top layer and the carrier tape together. The adhesive tape(s) may likewise have cutouts or incisions which correspond to those in the top layer such that the cable fastening elements may extend through both the top layer and the adhesive tape(s). The adhesive tape(s) accordingly at least in part adhesively connect the cable fastening elements to the top layer. The adhesive tape(s) assist in firmly holding the layer-like structure together with the cable fastening elements such that the semi-finished product may be particularly simply further processed or put to further use as a complete unit in the production of the wind turbine component or when attaching the semi-finished product to the wind turbine component.

According to one embodiment, the carrier tape has a layer of a peel ply fabric on an underside which is facing away from the cable fastening element. The peel ply fabric is a net-like layer which is removed or stripped off prior to attachment of the carrier tape onto the wind turbine component or prior to processing of the semi-finished product. The surface of the carrier tape is in this way activated for subsequent lamination. Adhesion or bonding of the carrier tape to a further material, such as in further processing, is in particular optimized.

According to one embodiment, the top layer includes one or more fiber material layers. For example, the top layer includes a laid fiber fabric, for instance a laid glass fiber fabric. It is likewise conceivable to use carbon fibers or laid carbon fiber fabrics. The top layer serves in particular to connect the semi-finished product to a further component part such as the wind turbine component in a lamination process and is provided to absorb a curing, liquid plastics material such as polyester resin or epoxy resin. The top layer is in particular made distinctly wider than the carrier tape.

According to one embodiment, the cable fastening elements take the form of cable holders. Such cable holders have one or more orifices or eyes by means of which further elements such as cables or hollow conduits can be connected with the cable fastening elements. A slotted empty conduit may, for example, be used for guiding cables. A slotted empty conduit permits accessibility to the cables for inspection and maintenance. The empty conduit for example takes the form of sinusoidally slotted empty conduit. This means that the slot takes a sinusoidal course. As a consequence, cables guided in the empty conduit may be particularly effectively inserted and retained therein. One portion of the empty conduit may be dilated by means of the slot, for example in order to remove a cable extending in the empty conduit for maintenance work.

According to one embodiment, the cable fastening elements have orifices or openings, wherein the orifices or openings are configured for fastening cables, tubes or fastening components. The orifices or openings are, for example, eyes. The orifices or openings enable the attachment of cable ties or other fastening components for connecting further component parts to the cable fastening elements. The cable fastening elements for example take the form of cable tie receptacles. The orifices or openings extend for example in one or more directions along a main plane of extension of the semi-finished product. In other words, they extend parallel to the carrier tape. This permits the attachment of cables, empty conduits or other fastening components such as cable ties in different orientations.

According to one embodiment, the cable fastening elements are configured such that an empty conduit, a cable or a connection element may be received in latching manner in the orifices or openings of the cable fastening elements. This permits particularly simple attachment of the stated elements, wherein no additional component parts or measures are necessary.

According to one embodiment, the cable fastening elements each have a protective element which at least partially prevents penetration of fluid into a respective orifice or opening.

The fluid is, for example, a liquid plastics material which is used in further processing, for instance an infusion process such as the vacuum infusion process. The protective element is, for example, a hood, a cap or a mat which closes the orifices or openings. Silicone may, for example, be considered as a material for the protective element.

According to one embodiment, the semi-finished product is of such flexible construction that the semi-finished product can be wound onto a reel. In particular, the carrier tape must accordingly be dimensioned in a thickness such that it can be wound onto reels. As a consequence, the semi-finished product may be simply transported and also unwound from the reels and further processed.

A further aspect discloses a wind turbine component which includes a semi-finished product according to the previously described aspect. The semi-finished product is firmly connected to the wind turbine component by lamination or is an integral component part of the finished component.

The wind turbine component permits substantially the above-stated advantages and functions. Explanations with regard to the semi-finished product according to the previously described aspect apply mutatis mutandis.

According to one embodiment, the cable fastening elements each have an opening through which a cable tie is guided. An empty conduit is further provided which extends along the cable fastening elements and is fixed in place to the cable fastening elements by means of the cable ties. The empty conduit is configured to receive and thus guide one or more cables. The wind turbine component thus permits the above-stated advantages and functions and in particular a cable guide system of a particularly simple and effective structure.

A further aspect discloses a wind turbine rotor blade which includes a semi-finished product according to the previously described aspect. The wind turbine rotor blade permits substantially the above-stated advantages and functions. Explanations with regard to the semi-finished product according to the previously described aspect apply mutatis mutandis.

The wind turbine rotor blade preferably has semi-finished products according to the previously described aspect in every area in which possible cable runs are located. In other words, irrespective of the electrical and optical systems which are subsequently actually used and fitted, the semi-finished products are fitted at all relevant locations. This ensures flexible production planning, in particular making it flexibly possible subsequently to fit any additional systems and guide the cable accordingly.

A further aspect discloses a method for producing a wind turbine component with a cable guide system. The method has the following steps:

introducing a fiber material layer structure for the wind turbine component into a corresponding manufacturing mold, wherein the fiber material layer structure includes a semi-finished product as claimed in one of claims 1 to 10, and laminating the fiber material layer structure in an infusion method, in particular in a vacuum infusion method, to form the wind turbine component with a cable guide system.

The method permits substantially the above-stated advantages and functions. Explanations with regard to the semi-finished product according to the previously described aspect apply mutatis mutandis. The method may be further developed in accordance with these explanations and correspondingly have further steps.

The fiber material layer structure may also be denoted laminate structure and has a plurality of layers of fiber semi-finished products, for instance woven or laid fabrics, mats or others. The lamination step involves infusing plastics material, also denoted matrix material. The laminate structure then cures to yield a laminate such that the wind turbine component is formed. In the described method, the semi-finished product is used in the production of the wind turbine component. In other words, the semi-finished product is an integral component part of the laminate structure in the production of the corresponding component.

Another aspect discloses a further method for producing a wind turbine component with a cable guide system, which method has the following steps:
providing an already completely cured laminate,
arranging a semi-finished product according to the previously described aspect on the laminate, and
laminating the semi-finished product onto the laminate to form the wind turbine component with a cable guide system.

The method permits substantially the above-stated advantages and functions. Explanations with regard to the semi-finished product according to the previously described aspect apply mutatis mutandis. The method may be further developed in accordance with these explanations and correspondingly have further steps.

In contrast with the previously described method, the semi-finished product is only subsequently laminated onto an already completely produced laminate. The completely cured laminate is, for example, a half-shell of a rotor blade, a web, a spar or a base plate. In other words, it is a component or component part of a wind turbine rotor blade which includes a laminate.

Further advantages, features and further developments are revealed by the following description of exemplary embodiments explained with reference to the figures. Identical, similar or identically acting elements may be provided with identical reference numerals in the figures.

Figure 3:
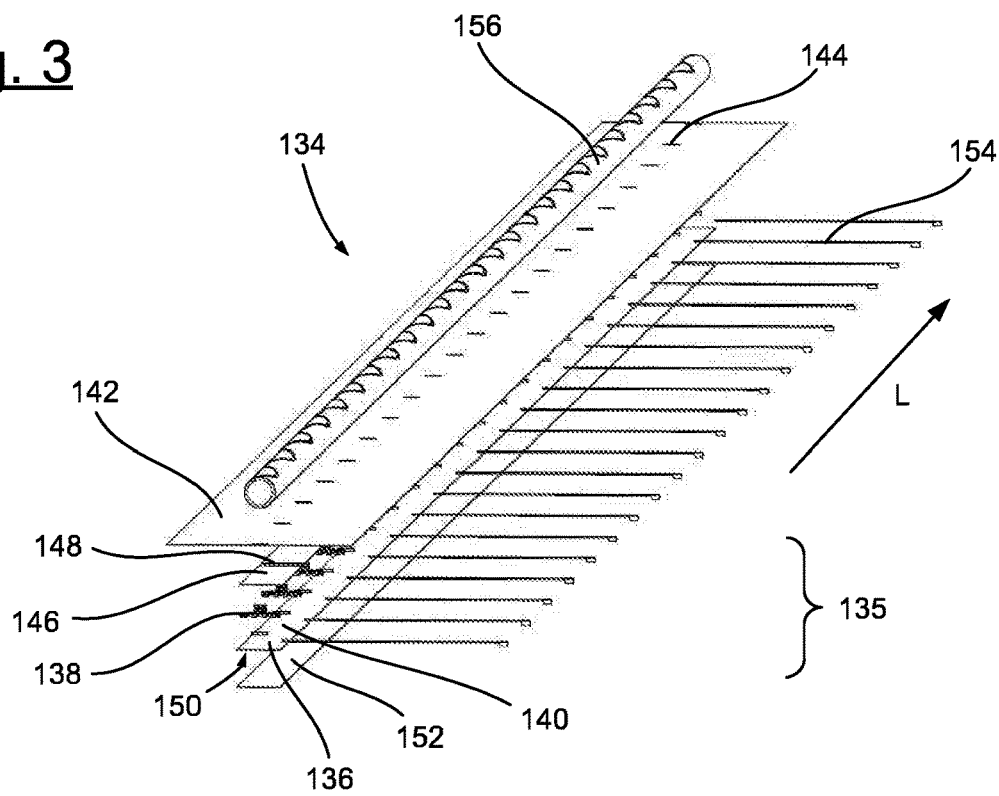
Figure 4:
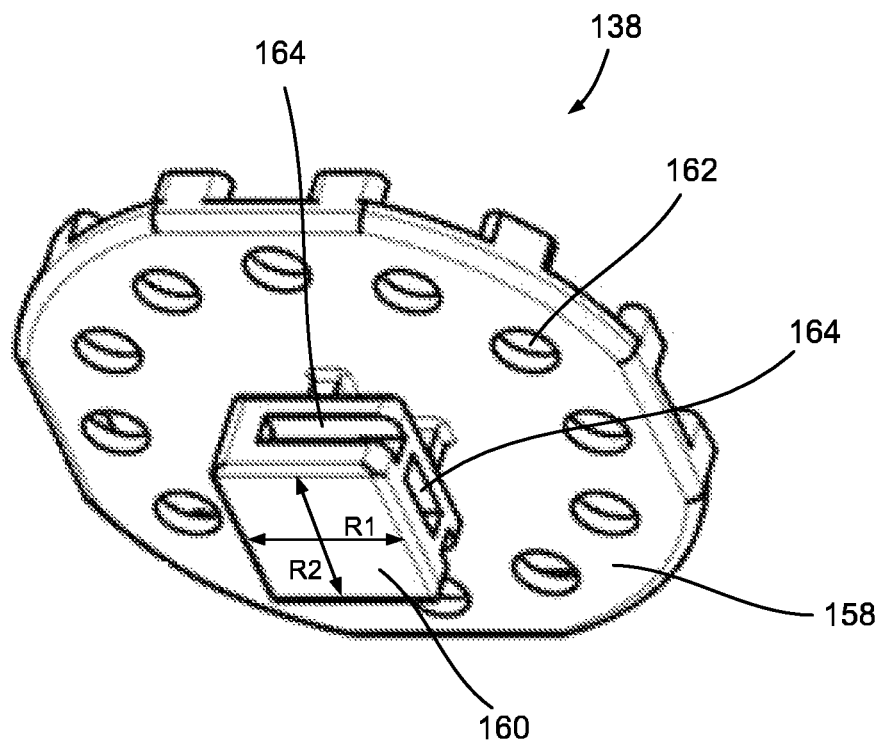
Figure 5:
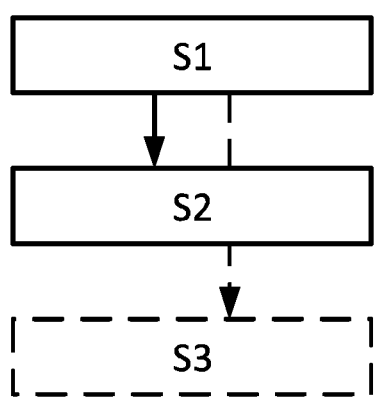

FIG. 3 is a perspective, schematic view of a semi-finished product according to an exemplary embodiment of the invention, FIG. 4 is a perspective, schematic view of a cable fastening element for a semi-finished product according to an exemplary embodiment of the invention, and FIG. 5 is a schematic sequence diagram of a method for producing a wind turbine component according to an exemplary embodiment of the invention.

Figure 1:
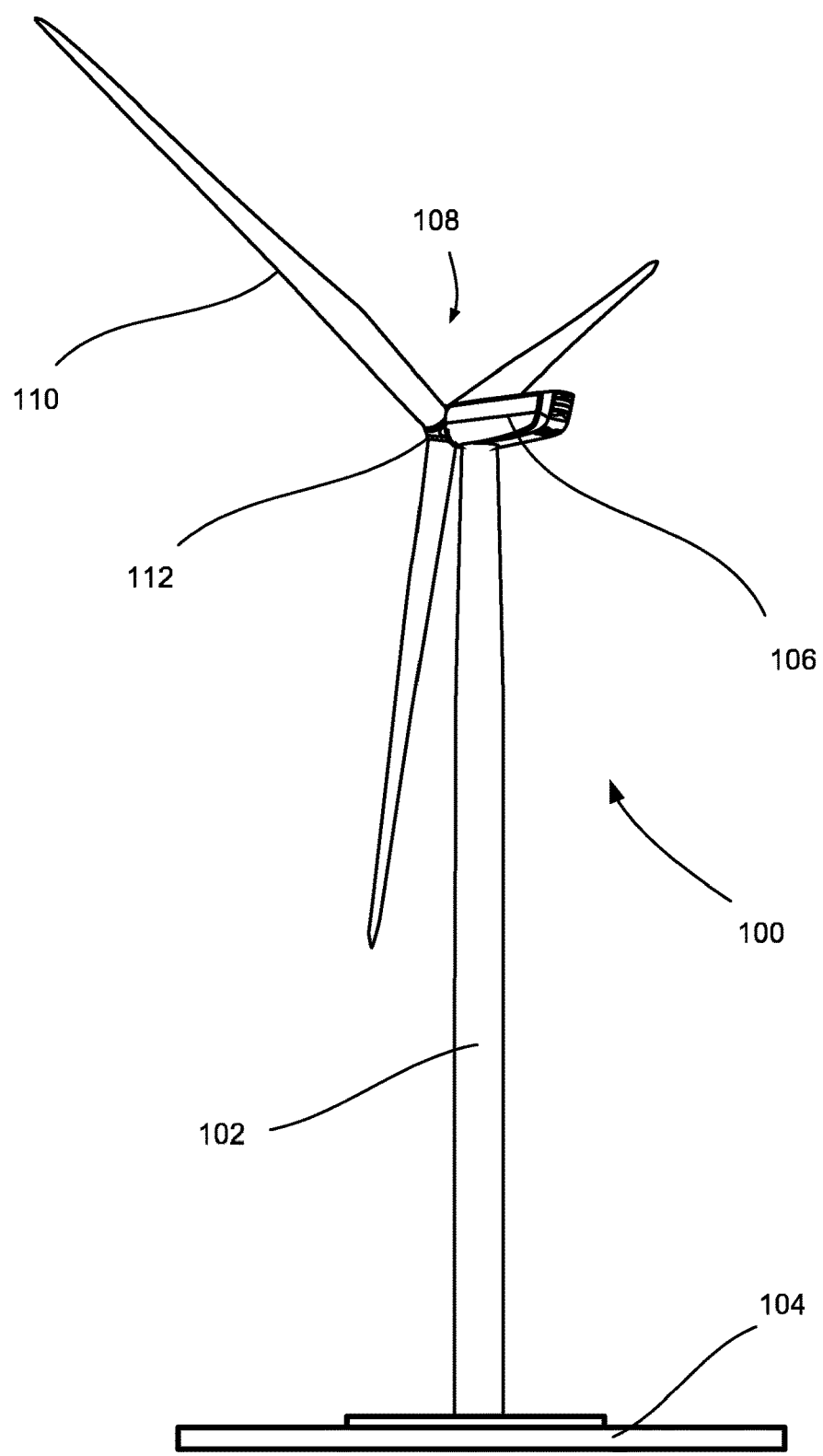
FIG. 1 is a schematic representation of a wind turbine.

FIG. 1 shows a schematic representation of a wind turbine 100. The wind turbine 100 has a tower 102. The tower 102 is fastened by means of a foundation 104 to a substrate. A nacelle 106 is rotatably mounted on an opposite end of the tower 102 to the substrate. The nacelle 106 has, for example, a generator which is coupled via a rotor shaft (not shown) with a rotor 108. The rotor 108 has one or more (wind turbine) rotor blades 110 which are arranged on a rotor hub 112.

In operation, the rotor 108 is set in rotation by a stream of air, for example wind. This rotational motion is transmitted via the rotor shaft and optionally a gear unit to the generator. The generator converts the kinetic energy of the rotor 108 into electrical energy.

Figure 2:
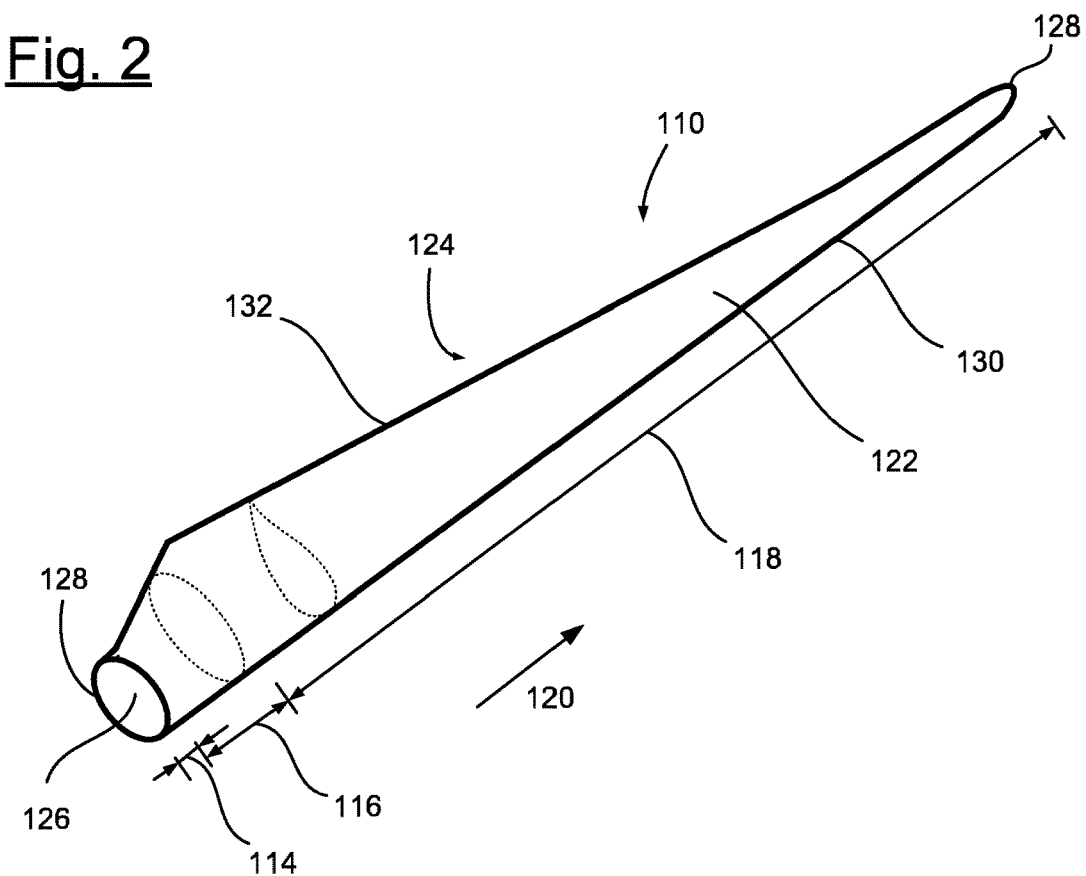
FIG. 2 is a schematic representation of a rotor blade of the wind turbine.

FIG. 2 shows an exemplary wind turbine rotor blade 110. The rotor blade 110 has the shape of a conventional rotor blade and has a rotor blade root zone 114 which faces or is associated with the rotor hub 112. The rotor blade root zone 114 typically has a substantially circular cross-section. The rotor blade root zone 114 is adjoined by a transitional zone 116 and a profile zone 118 of the rotor blade 110. The rotor blade 110 has a longitudinal axis 120 and a pressure side 122 and an opposing suction side 124. The rotor blade 110 is of substantially hollow construction internally. The rotor blade 110 has a blade root end 126 and a blade tip end 128. The rotor blade 110 has a leading edge 130 and a trailing edge 132.

As mentioned above, rotor blades may have one or more electrical and/or optical systems which require various cables to be laid in or on the rotor blade. For example, power and/or data cables have to be laid and guided. This typically entails the provision of cable guide systems.

FIG. 3 is a schematic exploded representation of a semi-finished product 134 according to an exemplary embodiment of the invention for a cable guide system. The semi-finished product 134 is of layer-like structure (layer-like structure 135) and is used as a manufactured module. In the finished state (not shown in the figures) it has a particularly flat structure.

The semi-finished product 134 has a cured carrier tape 136 which is manufactured from a glass fiber reinforced plastics material. The semi-finished product 134 has a plurality of cable fastening elements 138 which are positioned along the length L of the semi-finished product 134 on the carrier tape 136 and are fixed in place on the carrier tape 136 by means of adhesive bonds 140. The semi-finished product 134 has a top layer 142 which takes the form of a laid glass fiber fabric. In the structure shown according to FIG. 3, the top layer 142 is the uppermost layer of the semi-finished product 134 and lies over the cable fastening elements 138. In correspondence with the cable fastening elements 138, the top layer 142 has cutouts or incisions 144 through which the cable fastening elements 138 at least in places project out from the semi-finished product 134. The cable fastening elements 138 are securely held between top layer 142 and carrier tape 136.

The semi-finished product 134 furthermore has an optional mesh adhesive tape 146 which firmly connects the top layer 142 to the carrier tape 136. The mesh adhesive tape 146 also in places adhesively bonds the cable fastening elements 138 to the top layer 142 and assists in securely holding the structure of the semi-finished product 134 and in particular the cable fastening elements 138. The mesh adhesive tape 146 likewise has a plurality of cutouts or incisions 148 which correspond to the cable fastening elements 138 and through which the cable fastening elements 138 extend at least in part.

As explained above, an optional peel ply fabric 152 is attached to an underside 150 of the carrier tape 136 which is facing away from the cable fastening elements 138.

The semi-finished product 134 permits the above-stated advantages and functions. Inter alia, the semi-finished product 134 permits a particularly flexible cable guide system for a wind turbine component which is also simple and inexpensive to produce and is particularly easy to handle. By means of the cable fastening elements 138, the semi-finished product 134 in particular permits the indirect or direct attachment of cables and thus the formation of a cable guide system. Depending on the form taken by the cable fastening elements 138, cables may, for example, be guided on the semi-finished product 134 directly, by means of additional connecting elements or by means of hollow conduits. The semi-finished product 134 is constructed such that it can be wound onto or off a reel. In particular, while the carrier tape 136 is indeed cured and thus more rigid than the mesh adhesive tape 146 or the top layer 142, it nevertheless permits the carrier tape 136 to be wound up and unwound.

The wind turbine component is for example the above-mentioned wind turbine rotor blade 110 or a component part thereof, such as for instance a half-shell, the base plate or other component parts with a laminate.

The semi-finished product 134 is for example used in the manufacture of a wind turbine component and is consequently an integral component part of the component. Alternatively, the semi-finished product is laminated in a further manufacturing step onto the wind turbine component after manufacture of the wind turbine component, i.e. after curing thereof. This is explained below with reference to FIG. 5.

FIG. 3 shows an exemplary development in which the cable fastening elements 138 take the form of cable holders and have one or more openings (not provided with reference signs). Cable ties 154, which serve to fasten an empty conduit 156, are guided through these openings. The empty conduit 156 is constructed to guide one or more cables. The empty conduit 156 may be of slotted construction, such that the cables may be laid in the empty conduit 156 by dilating the empty conduit 156 along the slot. The slot-like construction in particular permits simple installation and removal of the cables, in particular for maintenance purposes. The slot may optionally take a sinusoidal course along the length L.

FIG. 4 shows an exemplary embodiment of a cable fastening element 138 which takes the form of a cable holder. The cable fastening element 138 has a plate 158 from which a holder body 160 projects. The plate 158 has a plurality of through-orifices 162 which are filled with plastics material during lamination, so providing an interlocking connection of the cable fastening element 138 with the plastics material. The holder body 160 has openings 164 which extend along two directions R1 and R2 parallel to the plate 158 and thus also to the carrier tape 136 or the semi-finished product 134. Connecting elements such as the mentioned cable ties may consequently be passed through in directions R1 and R2. In particular, the majority of the holder body 160 passes through the cutouts or incisions in the mesh adhesive tape 146 and the top layer 142 of a semi-finished product 134.

Two production methods for a wind turbine component described according to exemplary embodiments of the invention are described below with reference to FIG. 5.

In a first step S1 of the first production method, a fiber material layer structure for the wind turbine component is introduced into a corresponding manufacturing mold. The fiber material layer structure includes a semi-finished product 134 as described above with reference to FIG. 3. In other words, in addition to a plurality of fiber material layers such as woven fabrics etc., the semi-finished product 134 is laid in the manufacturing mold, for example as the final layer. Together, the fiber material layers and the semi-finished product 134 form the fiber material layer structure. It should be noted that, prior to introduction of the semi-finished product 134, any attached peel ply fabric 152 is removed.

The fiber material layer structure is then laminated in a subsequent step S2 using a vacuum infusion method. A (matrix) plastics material such as epoxy resin is here infused and the structure then cures. As a consequence, the wind turbine component includes the semi-finished product 134 as an integral component part, such that a cable guide system is formed.

In a first step S1 of the second production method, an already completely cured laminate is provided.

In a second step S2, the semi-finished product 134 is arranged on the laminate, for instance laid and positioned thereon. Adhesive tapes such as mesh adhesive tapes may be used as auxiliaries in order to ensure that the semi-finished product 134 is securely positioned on the laminate for subsequent manufacture. Again, if present, the peel ply fabric 152 is removed prior to arrangement on the laminate.

In a third step S3 (drawn in dashed lines since only relevant to the second production method), the semi-finished product 134 is laminated onto the laminate to form the wind turbine component with a cable guide system. This again means that infusion with (matrix) plastics material takes place. The semi-finished product 134 then cures and is firmly connected to the wind turbine component.

Depending on the form taken by the cable fastening elements 138, cable ties, hollow conduits and/or cables may be fastened in subsequent steps in both production methods.

In exemplary embodiments which are not shown, protective elements such as silicone hoods are provided which are placed on the cable fastening elements 138 prior to the lamination steps, i.e. introduction and curing of plastics material, in order to protect the orifices or openings of the cable fastening elements from penetration by plastics material. Protection is here above all required for the orifices/openings into which hollow conduits, connecting elements such as cable ties, cables or the like are to be inserted or introduced.

LIST OF REFERENCE SIGNS

100 Wind turbine
102 Tower
104 Foundation
106 Nacelle
108 Rotor
110 Rotor blade, wind turbine rotor blade
112 Rotor hub
114 Rotor blade root zone
116 Transitional zone
118 Profile zone
120 Longitudinal axis
122 Pressure side
124 Suction side
126 Blade root end
128 Blade tip end
130 Leading edge
132 Trailing edge
134 Semi-finished product
135 Layer-like structure
136 Carrier tape
138 Cable fastening elements
140 Adhesive bond
142 top layer
144 Cutout or incision
146 Mesh adhesive tape
148 Cutout or incision
150 Underside
152 Peel ply fabric
154 Cable tie
156 Empty conduit
158 Plate
160 Holder body 162 Plate orifices
164 Openings
L Length
R1 Direction
R2 Direction

The invention claimed is:

1. A semi-finished product (134) for a cable guide system in a wind turbine component comprising a layer-like structure (135) with
   a carrier tape (136),
   a plurality of cable fastening elements (138) fixed on the carrier tape (136), wherein the plurality of cable fastening elements (138) are distributed along a length (L) of the carrier tape (136), and
   a top layer (142) with a plurality of cutouts or incisions (144), wherein the cable fastening elements (138) are arranged between the top layer (142) and carrier tape (136) in such a way that each cable fastening element (138) at least in part projects out from the top layer (142) from a corresponding cutout or incision (144),
   wherein the semi-finished product (134) comprises at least one cable retained by at least one of the cable fastening elements (138).

2. The semi-finished product (134) as claimed in claim 1, wherein the cable fastening elements (138) are adhesively bonded to the carrier tape (136).

3. The semi-finished product (134) as claimed in claim 1, including one or more mesh adhesive tapes (146), which are arranged between the top layer (142) and the carrier tape (136) and adhesively connect the top layer (142) and the carrier tape (136) together.

4. The semi-finished product (134) as claimed in claim 1, wherein the carrier tape (136) has a layer of a peel ply fabric (152) on an underside (150) which is facing away from the cable fastening elements (138).

5. The semi-finished product (134) as claimed in claim 1, wherein the top layer (142) includes one or more fiber material layers.

6. The semi-finished product (134) as claimed in claim 1, wherein the cable fastening elements (138) take the form of cable holders.

7. The semi-finished product (134) as claimed claim 1, wherein the cable fastening elements (138) have orifices or openings (164), wherein the orifices or openings (164) are configured for fastening cables, tubes or fastening components.

8. The semi-finished product (134) as claimed in claim 7, wherein the cable fastening elements (138) are configured such that an empty conduit, a cable or connection element may be received in latching manner in the orifices or openings (164).

9. The semi-finished product (134) as claimed in claim 7, wherein the cable fastening elements (138) each have a protective element which at least partially prevents penetration of fluid into a respective orifice or opening (164).

10. The semi-finished product (134) as claimed in claim 1, wherein the semi-finished product (134) is of such flexible construction that the semi-finished product (134) can be wound onto a reel.

11. The semi-finished product (134) of claim 1, further comprising a plurality of cable ties (154) for fastening the at least one cable to the at least one of the cable fastening elements (138).

12. A wind turbine component (110) including a semi-finished product (134) as claimed in claim 1.

13. The wind turbine component (110) as claimed in claim 12, wherein the cable fastening elements (138) each have an opening (164) through which a cable tie (154) is guided, wherein a slotted empty conduit is further provided which extends along the cable fastening elements (138) and is fixed in place to the cable fastening elements (138) by means of the cable ties (154).

14. A wind turbine rotor blade (110) including a semi-finished product (134) as claimed in claim 1.

15. A method for producing a wind turbine component with a cable guide system, wherein the method comprises the following steps:
   introducing a fiber material layer structure for the wind turbine component into a corresponding manufacturing mold, wherein the fiber material layer structure includes the carrier tape (136), the plurality of cable fastening elements (138) and the top layer (142) of a semi-finished product (134) as claimed in claim 1,
   laminating the fiber material layer structure in a vacuum infusion method to form the wind turbine component with a cable guide system, and
   fastening the at least one cable to at least one of the cable fastening elements (138).

16. A method for producing a wind turbine component with a cable guide system, wherein the method comprises the following steps:
   providing an already completely cured laminate,
   arranging the carrier tape (136), the plurality of cable fastening elements (138) and the top layer (142) of a semi-finished product (134) as claimed in claim 1 on the laminate,
   laminating the carrier tape (136), the plurality of cable fastening elements (138) and the top layer (142) of the semi-finished product (134) onto the laminate to form the wind turbine component with a cable guide system, and
   fastening the at least one cable to at least one of the cable fastening elements (138).

* * * * *